(12) United States Patent
Tsuchimochi

(10) Patent No.: US 8,967,925 B2
(45) Date of Patent: Mar. 3, 2015

(54) MACHINE TOOL

(75) Inventor: Koji Tsuchimochi, Nara (JP)

(73) Assignee: DMG Mori Seiki Co., Ltd., Nara (JP)

( * ) Notice: Subject to any disclaimer, the term of this patent is extended or adjusted under 35 U.S.C. 154(b) by 686 days.

(21) Appl. No.: 13/218,776

(22) Filed: Aug. 26, 2011

(65) Prior Publication Data

US 2012/0121353 A1 May 17, 2012

(30) Foreign Application Priority Data

Nov. 11, 2010 (JP) .................................. 2010-252500
Aug. 24, 2011 (JP) .................................. 2011-182853

(51) Int. Cl.
| | | |
|---|---|---|
| B23F 21/16 | (2006.01) | |
| B23F 5/22 | (2006.01) | |
| B23F 17/00 | (2006.01) | |
| B23F 23/08 | (2006.01) | |

(52) U.S. Cl.
CPC ................. B23F 5/22 (2013.01); B23F 17/006 (2013.01); B23F 23/08 (2013.01)
USPC .... 409/15; 409/12; 409/14; 29/40; 29/893.35

(58) Field of Classification Search
USPC ...................... 409/1–247; 29/56.5, 40, 893.3; 74/813 R
See application file for complete search history.

(56) References Cited

U.S. PATENT DOCUMENTS

| | | | | |
|---|---|---|---|---|
| 2,988,964 | A * | 6/1961 | Van Acker | 409/15 |
| 3,267,344 | A * | 8/1966 | McDaniel | 318/39 |
| 3,760,472 | A * | 9/1973 | Kielma et al. | 29/40 |
| 4,329,096 | A * | 5/1982 | Herscovici | 409/15 |
| 4,663,721 | A * | 5/1987 | Herscovici | 700/160 |
| 5,037,252 | A * | 8/1991 | Hasegawa et al. | 409/2 |
| 5,205,806 | A * | 4/1993 | Ishida et al. | 483/18 |
| 5,634,250 | A * | 6/1997 | Mihailovic | 29/26 A |
| 5,820,537 | A * | 10/1998 | Zecchetto et al. | 483/55 |
| 6,079,090 | A * | 6/2000 | Ongaro | 29/27 C |
| 6,618,917 | B2 * | 9/2003 | Sugiura et al. | 29/27 C |
| 8,246,026 | B2 * | 8/2012 | Hyatt et al. | 269/55 |
| 8,707,528 | B2 * | 4/2014 | Ozdyk et al. | 29/27 C |
| 2007/0209179 | A1 * | 9/2007 | Williams et al. | 29/27 C |

FOREIGN PATENT DOCUMENTS

JP 2004-25333 1/2004

* cited by examiner

*Primary Examiner* — Eric A Gates
*Assistant Examiner* — Paul M Janeski
(74) *Attorney, Agent, or Firm* — Miller, Matthias & Hull LLP

(57) ABSTRACT

A machine tool re-machines a workpiece after positioning drive motors, a hob and the workpiece by stopping the drive motors with the rotational positions of the drive motors, the hob and the workpiece corresponding to their respective zero positions. For this purpose, a drive control section recognizes, based on the rotational-speed ratio of the drive motor corresponding to the hob and the hob and/or the rotational-speed ratio of the drive motor corresponding to the workpiece to the workpiece, and detection signals from detection sensors detecting that the rotational positions of the drive motors are at their respective zero positions, detections signals when the rotational positions of the drive motors and the rotational positions of the hob and the workpiece correspond to their respective zero positions, and stops the drive motors with the rotational positions of the drive motors, the hob and the workpiece corresponding to their respective zero positions.

2 Claims, 3 Drawing Sheets

MACHINE TOOL

TECHNICAL FIELD

The present disclosure relates to a machine tool in which gear cutting is performed while rotating a hob and a workpiece about their respective axes.

BACKGROUND ART

As such a machine tool, the gear hobbing machine disclosed in the Japanese Unexamined Patent Application Publication No. 2004-25333 is known, for example. This gear hobbing machine has a bed, a column provided on the bed in such a manner that it is movable in an X-axis direction which is a horizontal direction, a saddle supported on the front face of the column in such a manner that it is movable in a Z-axis direction which is the vertical direction, a hob head disposed on the saddle, a hob shaft which is supported by the hob head in such a manner that it is rotatable about its axis and is parallel to a horizontal direction (Y-axis direction) perpendicular to the X-axis direction and to which a hob is mounted coaxially, a hob-shaft driving motor for rotating the hob shaft about its axis via a gear train, a workpiece table which is provided on the bed in such a manner that it is horizontally rotatable and on which a workpiece is mounted coaxially, and a table driving motor for directly rotating the workpiece table horizontally.

In this gear hobbing machine, the rotational force of the hob-shaft driving motor is transmitted to the hob shaft via the gear train and thereby the hob shaft is rotated together with the hob, and the rotational force of the table driving motor is directly transmitted to the workpiece table and thereby the workpiece table is rotated together with a workpiece mounted thereon. At this time, the hob and the workpiece are rotated in such a manner that the phase of the hob and the phase of the workpiece correspond to each other. Thereafter, the column is moved in the X-axis direction to approach the workpiece and the saddle is moved in the Z-axis direction, and thereby the workpiece is machined by the hob.

The phase of the hob and the phase of the workpiece can be brought into correspondence with each other by, on the basis of, for example, detection signals obtained from a detection sensor for detecting that the rotational position of the hob-shaft driving motor is at its zero position and from a detection sensor for detecting that the rotational position of the table driving motor is at its zero position, bringing the rotational position of the hob-shaft driving motor and the rotational position of the table driving motor into correspondence with their respective zero positions and bringing the rotational position of the hob and the rotational position of the workpiece into correspondence with their respective zero positions, and then rotating the hob and the workpiece at their respective predetermined rotational speeds using their respective zero positions as reference. It is noted that the zero position means a rotational angular position which is a reference in the direction of rotation, and the zero positions of the hob-shaft driving motor and the hob are located at the same rotational angular position which is previously determined and similarly the zero positions of the table driving motor and the workpiece are also located at the same rotational angular position which is previously determined.

SUMMARY OF DISCLOSURE

By the way, in performing gear cutting on a workpiece, there is not only a case where the machining is completed by one process but also a case where the machining is performed by a plurality of processes, for example, a case where the machining is performed by two processes, rough cutting and finishing. In this case, it is necessary that the workpiece is machined with the phase of the hob and the phase of the workpiece corresponding to each other also in the second process. For this purpose, it is necessary that at the end of the first process, the rotation of the hob and the rotation of the workpiece are stopped with the phase of the hob and the phase of the workpiece corresponding to each other, or, that at the beginning of the second process, the machining is started after the phase of the hob and the phase of the workpiece are brought into correspondence with each other.

However, in the above conventional gear hobbing machine in which the rotational force of the hob-shaft driving motor is transmitted to the hob shaft via the gear train, if the rotational position of the hob is judged only on the basis of the rotational position of the hob-shaft driving motor, it is sometimes not possible to stop the rotation of the hob and the rotation of the workpiece with the phase of the hob and the phase of the workpiece corresponding to each other at the end of the first process or bring the phase of the hob and the phase of the workpiece into correspondence with each other at the beginning of the second process.

That is, there is no problem when the rotational speed of the hob-shaft driving motor and the rotational speed of the hob are equal to each other, such as when the velocity ratio of the gear train is 1 to 1. However, when the rotational speed of the hob-shaft driving motor and the rotational speed of the hob are different from each other, such as when the velocity ratio of the gear train is not 1 to 1, it is possible that, even when it is detected that the rotational position of the hob-shaft driving motor corresponds to its zero position, the then rotational position of the hob does not correspond to its zero position.

For example, assuming that the speed ratio of the rotational speed of the hob-shaft driving motor to the rotational speed of the hob is 2 to 1, there are two possible cases: one where the rotational position of the hob corresponds to its zero position when it is detected that the rotational position of the hob-shaft driving motor corresponds to its zero position, and one where the rotational position of the hob is shifted by 180° from its zero position when it is detected that the rotational position of the hob-shaft driving motor corresponds to its zero position.

Because of the shift of the rotational position of the hob from its zero position as described above, the phase of the hob and the phase of the workpiece are brought into a state where they are shifted from each other. If the machining of the second process is performed in this state, there is a possibility that, for example, gear teeth which were machined and formed in the first process are damaged and a possibility that a large load is applied to the hob and thereby the hob is broken.

When the rotational speed of the hob-shaft driving motor and the rotational speed of the hob are different from each other, the provision a detection sensor for detecting that the rotational position of the hob is at its zero position to recognize, on the basis of a detection signal obtained from the detection sensor, whether the rotational position of the hob corresponds to its zero position makes it possible to surely recognize whether the rotational position of the hob corresponds to its zero position even though the rotational speed of the hob-shaft driving motor and the rotational speed of the hob are different from each other, and therefore it is possible to prevent the occurrence of such disadvantages as described above. However, there may be a case where it is physically difficult to provide such a detection sensor, and there is a problem that the manufacturing cost is increased by providing such a detection sensor.

The present disclosure has been achieved in view of the above-described circumstances, and an object thereof is to provide a machine tool for machining with a hob, capable of, when re-machining a workpiece, surely preventing the occurrence of phase shift between the hob and the workpiece.

The present disclosure, for achieving the above-described object, relates to a machine tool for performing gear cutting on a workpiece with a hob, comprising:

a first holding member for holding the hob;
a second holding member for holding the workpiece;
first drive means having a first drive motor for rotating the hob held by the first holding member about its axis;
second drive means having a second drive motor for rotating the workpiece held by the second holding member about its axis;
first detecting means transmitting a first detection signal when detecting that the rotational position of the first drive motor is at its zero position;
second detecting means transmitting a second detection signal when detecting that the rotational position of the second drive motor is at its zero position; and
control means for controlling the operations of the drive motors, either the rotational speeds of the first drive motor and the hob or the rotational speeds of the second drive motor and the workpiece being set at rotational speeds different from each other, the machine tool characterized in that the control means is configured to, when stopping the drive motors, recognize, on the basis of the speed ratio of the rotational speed of the first drive motor to the rotational speed of the hob and the speed ratio of the rotational speed of the second drive motor to the rotational speed of the workpiece and the detection signals transmitted from the first and second detecting means, detection signals transmitted when the rotational positions of the drive motors and the rotational positions of the hob and the workpiece correspond to their respective zero positions, and stop the drive motors so that the rotational positions of the drive motors, the hob and the workpiece correspond to their respective zero positions.

According to the disclosure, when stopping the drive motors, the control means recognizes, on the basis of the speed ratio of the rotational speed of the first drive motor to the rotational speed of the hob and/or the speed ratio of the rotational speed of the second drive motor to the rotational speed of the workpiece and the first and second detection signals transmitted from the first and second detecting means, detection signals transmitted when the rotational positions of the drive motors and the rotational positions of the hob and the workpiece correspond to their respective zero positions, and stops the drive motors so that the rotational positions of the drive motors, the hob and the workpiece correspond to their respective zero positions.

Therefore, even when the rotational speeds of the first drive motor and the hob are different from each other and/or the rotational speeds of the second drive motor and the workpiece are different from each other, it is possible to stop the drive motors with the rotational positions of the first drive motor and the hob corresponding to their respective zero positions and the rotational positions of the second drive motor and the workpiece corresponding to their respective zero positions.

Consequently, when the workpiece is thereafter further machined, such as when finishing is performed on the workpiece, the subsequent machining can be performed without any additional operation, such as repositioning the rotational positions of the drive motors, the hob and the workpiece at their respective zero positions, being required. Further, it is possible to surely prevent phase shift between the hob and the workpiece, and therefore it is possible to prevent the occurrence of a problem that gear teeth which were machined and formed in the preceding process are damaged by the machining of the subsequent process and a problem that a large load is applied to the hob and thereby the hob is broken. Furthermore, the occurrence of these problems can be prevented without particularly providing any new component.

It is noted that, the control means may be configured to, before re-machining the workpiece instead of when stopping the drive motors, position the rotational positions of the drive motors, the hob and the workpiece by, after rotating the drive motors in advance, recognizing, on the basis of the speed ratio of the rotational speed of the first drive motor to the rotational speed of the hob and the speed ratio of the rotational speed of the second drive motor to the rotational speed of the workpiece and the detection signals transmitted from the first and second detecting means, detection signals transmitted when the rotational positions of the drive motors and the rotational positions of the hob and the workpiece correspond to their respective zero positions and stopping the drive motors so that the rotational positions of the drive motors, the hob and the workpiece correspond to their respective zero positions, and then rotate the drive motors again and re-machine the workpiece.

In this case, since the machining of the workpiece is restarted after positioning the rotational positions of the drive motors, the hob and the workpiece at their respective zero positions, the machining can be restarted with the phase of the hob and the phase of the workpiece corresponding to each other even when the drive motors were stopped with the rotational positions of the first drive motor and the hob shifted from the their respective zero positions and/or the rotational positions of the second drive motor and the workpiece shifted from their respective zero positions.

Therefore, similarly to the above, it is possible to prevent the occurrence of the problem that gear teeth which were machined and formed in the preceding process are damaged by the machining of the subsequent process and the problem that a large load is applied to the hob and thereby the hob is broken.

Further, in a case where the first drive means is configured to be able to be switched between a connected state where the first drive motor and the hob are connected to each other and a released state where the connection therebetween is released, the control means may be configured to, when stopping the drive motors and switching the first drive means into the released state, recognize, on the basis of said speed ratios and the detection signals, detection signals transmitted when the rotational positions of the drive motors and the rotational positions of the hob and the workpiece correspond to their respective zero positions, and stop the drive motors so that the rotational positions of the drive motors, the hob and the workpiece correspond to their respective zero positions, and then switch the first drive means into the released state.

When thus configured, it is possible to stop the drive motors with the rotational positions of the first drive motor and the hob corresponding to their respective zero positions and the rotational positions of the second drive motor and the workpiece corresponding to their respective zero positions and release the connection between the first drive motor and the hob in this state. Therefore, when the first drive motor and the hob are reconnected to each other, the rotational positions of the first drive motor and the hob correspond to their respective zero positions as long as the rotational positions of the first drive motor and the hob have not been changed. Therefore, when restarting machining the workpiece, the machining can be restarted immediately without any additional operation, such as repositioning the rotational positions of the drive motors, the hob and the workpiece at their respective zero positions, being required.

Alternatively, the control means may be configured to cause a repositioning operation as described above to be performed, instead of when stopping the drive motors, when switching the first drive means from the released state to the connected state to re-machine the workpiece.

In this case, the machine tool further comprises rotational-position detecting means for detecting the rotational position of the first drive motor and the control means further has rotational-position storage means in which the rotational position of the first drive motor when stopped, which is detected by the rotational-position detecting means, and the rotational position of the hob when stopped, which is calculated on the basis of the speed ratio of the rotational speed of the first drive motor to the rotational speed of the hob and the rotational position of the first drive motor when stopped, are stored. Further, in this case, the control means is configured to, when switching the first drive means from the released state to the connected state and restarting machining the workpiece, position the rotational positions of the drive motors, the hob and the workpiece by driving the first drive motor and stopping it so that the rotational position of the first drive motor corresponds to the rotational position thereof stored in the rotational-position storage means before connecting the first drive motor and the hob, and then switching the first drive means into the connected state and rotating the drive motors, and recognizing, on the basis of said speed ratios and the first and second detection signals and the rotational position of the hob when the first drive means was switched into the released state and the rotational position of the first drive motor when its rotation is stopped, first and second detection signals transmitted when the rotational positions of the drive motors and the rotational positions of the hob and the workpiece correspond to their respective zero positions and stopping the drive motors so that the rotational positions of the drive motors, the hob and the workpiece correspond to their respective zero positions, and then restart machining the workpiece.

When thus configured, even if the drive motors were stopped with the rotational positions of the first drive motor and the hob shifted from their respective zero positions and/or the rotational positions of the second drive motor and the workpiece shifted from their respective zero positions and then the connection between the first drive motor and the hob was released, when they are reconnected to each other and the workpiece is re-machined, the machining can be restarted with the phase of the hob and the phase of the workpiece corresponding to each other.

As an example of the case where the first drive means is configured to be able to be switched between the connected state and the released state, there can be mentioned a case where a plurality of tools including a hob are attached to a turret and a tool indexed at a predetermined machining position among the plurality of tools attached to the turret can be rotated by the first drive motor.

As described above, according to the machine tool of the present disclosure, it is possible to, when re-machining a workpiece with a hob, surely bring the phase of the hob and the phase of the workpiece into correspondence with each other, and therefore it is possible to surely prevent the occurrence of machining defects caused by phase shift.

DETAILED DESCRIPTION

Hereinafter, specific embodiments of the present disclosure will be described on the basis of the accompanying drawings.

Figure 1:
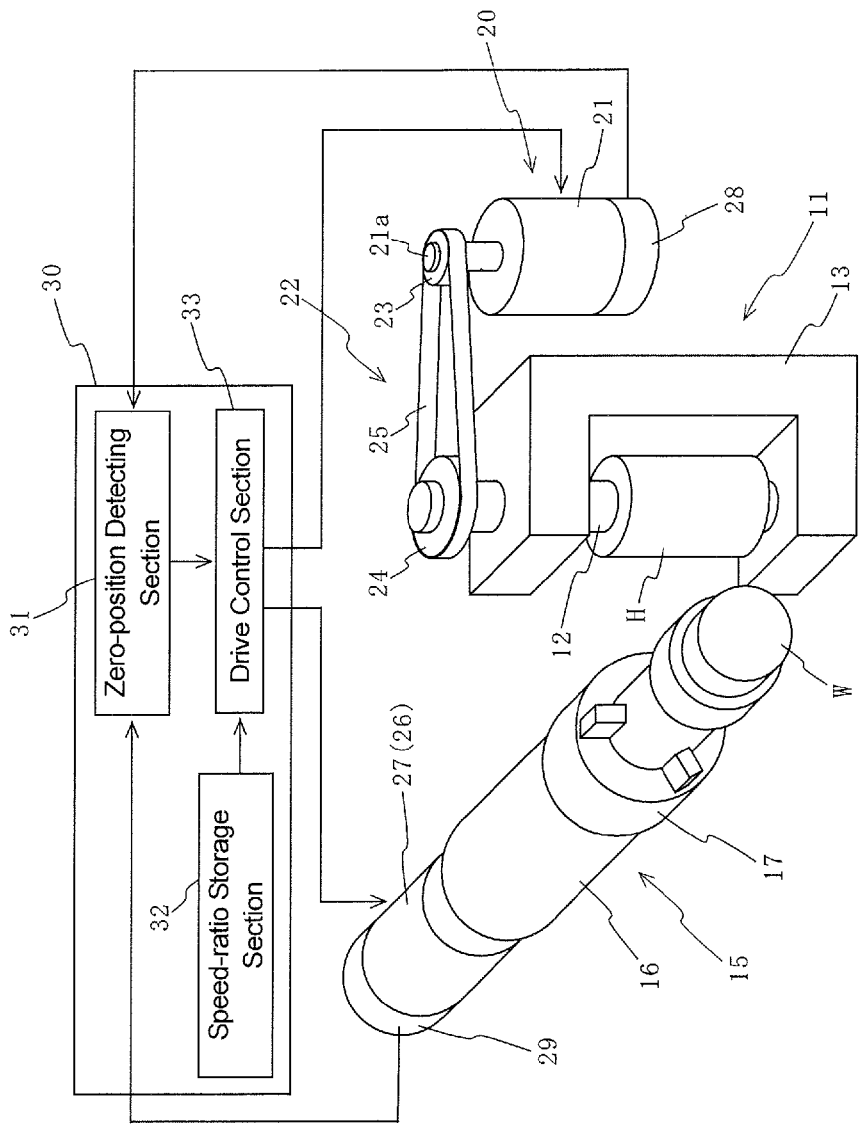
FIG. 1 is a perspective view showing a schematic configuration of a machine tool according to a first embodiment of the present disclosure, wherein the configuration is partially shown by a block diagram.

As shown in FIG. 1, a machine tool 1 according to a first embodiment of the present disclosure has a hob holding body 11 holding a cylindrical hob H in such a manner that it is rotatable about its axis, a workpiece holding body 15 holding a cylindrical workpiece W in such a manner that it is rotatable about its axis, a hob driving mechanism 20 for rotating the hob H held by the hob holding body 11 about its axis, a workpiece driving mechanism 26 for rotating the workpiece W held by the workpiece holding body 15 about its axis, a feed mechanism (not shown) for feeding the hob H held by the hob holding body 11 and the workpiece W held by the workpiece holding body 15, and a controller 30 for controlling the operations of the hob driving mechanism 20, the workpiece driving mechanism 26 and the feed mechanism (not shown).

The hob holding body 11 comprises a hob shaft 12 which is fitted in the central hole of the hob H with its both ends protruding therefrom and a holding member 13 holding the ends of the hob shaft 12 in such a manner that the hob shaft 12 is rotatable about its axis, and the workpiece holding body 15 comprises a spindle 16 disposed in such a manner that it is rotatable about its axis and a chuck 17 which is attached to the tip of the spindle 16 for gripping one end of the workpiece W in such a manner that it is coaxial with the spindle 16. It is noted that the hob H and the workpiece W are held with their axes orthogonal to each other.

The hob driving mechanism 20 comprises a drive motor 21 and a transmission mechanism 22 for transmitting the rotational force of the drive motor 21 to the hob shaft 12, the transmission mechanism 22 comprises a driving pulley 23 provided on an output shaft 21a of the drive motor 21, a driven pulley 24 provided on one end of the hob shaft 12, and a drive belt 25 provided connecting the pulleys 23 and 24. The rotational force of the drive motor 21 is transmitted to the hob shaft 12 via the driving pulley 23, the drive belt 25 and the driven pulley 24, and thereby the hob H is rotated together with the hob shaft 12.

The driving and driven pulleys 23 and 24 are configured in such a manner that the speed ratio of the rotational speed of the driving pulley 23 (that is, the rotational speed of the drive motor 21) to the rotational speed of the driven pulley 24 (that is, the rotational speed of the hob H) is not 1 to 1. Therefore, the hob H is rotated at a rotational speed different from the rotational speed of the drive motor 21.

The workpiece driving mechanism 26 comprises a drive motor 27 and a coupling (not shown) connecting an output shaft of the drive motor 27 and the rear end of the spindle 16, and the spindle 16 is rotated together with the chuck 17 and the workpiece W by the rotational force of the drive motor 27. Further, the rotational speed of the drive motor 27 and the rotational speed of the spindle 16 (workpiece W) are equal to each other.

Additionally, the drive motors 21 and 27 have rotary encoders 28 and 29 attached thereto, respectively, the rotary encoders 28 and 29 detecting the rotational positions (rotational angular positions) of the drive motors 21 and 27, respectively.

The feed mechanism (not shown) relatively moves the holding member 13 and the spindle 16, for example, in a direction orthogonal to both of the axis of the hob shaft 12 and the axis of the spindle 16 and in the direction of the axis of the spindle 16, thereby relatively moving the hob H and the workpiece W.

The controller 30 has a zero-position detecting section 31 for detecting that the rotational position of the drive motor 21 is at its zero position and that the rotational position of the drive motor 27 is at its zero position, a speed-ratio storage section 32 in which the speed ratio of the rotational speed of the drive motor 21 to the rotational speed of the hob H and the speed ratio of the rotational speed of the drive motor 27 to the rotational speed of the workpiece W (1 to 1) are stored, and a drive control section 33 for controlling the drive motors 21, 27 and the feed mechanism (not shown). It is noted that the zero-position detecting section 31 and the rotary encoders 28, 29 correspond to the aforementioned first and second detecting means.

When the rotational position of the drive motor 21 is brought into correspondence with its zero position, the zero-position detecting section 31 detects the correspondence on the basis of the rotational position of the drive motor 21 detected by the rotary encoder 28 and transmits a first detection signal, and when the rotational position of the drive motor 27 is brought into correspondence with its zero position, the zero-position detecting section 31 detects the correspondence on the basis of the rotational position of the drive motor 27 detected by the rotary encoder 29 and transmits a second detection signal. It is noted that the zero positions of the drive motors 21, 27, the hob H and the workpiece W are each optionally set and the zero positions of the drive motor 21 and the hob H are positioned at the same rotational angular position and the zero positions of the drive motor 27 and the workpiece W are similarly positioned at the same rotational angular position.

The drive control section 33 causes the drive motor 21 to rotate the hob shaft 12 and the hob H and causes the drive motor 27 to rotate the spindle 16, the chuck 17 and the workpiece W, and causes the feed mechanism (not shown) to relatively move the hob H and the workpiece W, which are rotating about their respective axes, thereby performing gear cutting on the workpiece W. At this time, the drive control section 33 rotates the hob H and the workpiece W at their respective predetermined rotational speeds using their respective zero positions as reference after bringing the rotational positions of the hob H and the drive motor 21 into correspondence with their respective zero positions and bringing the rotational positions of the workpiece W and the drive motor 27 into correspondence with their respective zero positions. Thereby, the phase of the hob H and the phase of the workpiece W are brought into correspondence with each other.

Further, when stopping the drive motors 21, 27 being rotating, for the drive motor 21, the drive control section 33 recognizes, on the basis of the speed ratio of the rotational speed of the drive motor 21 to the rotational speed of the hob H stored in the speed-ratio storage section 32 and the first detection signals transmitted from the zero-position detecting section 31, a first detection signal transmitted when the rotational positions of the drive motor 21 and the hob H correspond to their respective zero positions, and stops the drive motor 21 so that the rotational positions of the drive motor 21 and the hob H correspond to their respective zero positions, and, for the drive motor 27, the drive control section 33 recognizes, on the basis of the speed ratio to the rotational speed of the drive motor 27 to the rotational speed of the workpiece W stored in the speed-ratio storage section 32 and the second detection signals transmitted from the zero-position detecting section 31, a second detection signal transmitted when the rotational positions of the drive motor 27 and the workpiece W correspond to their respective zero positions, and stops the drive motor 27 so that the rotational positions of the drive motor 27 and the workpiece W correspond to their respective zero positions. Thereby, the rotational positions of the drive motors 21, 27, the hob H and the workpiece W correspond to their respective zero positions.

In a case where the speed ratio of the rotational speed of the drive motor 21 to the rotational speed of the hob H is, for example, 2 to 1, the hob H completes only ½ rotation when the drive motor 21 completes one rotation, and the hob H completes one rotation when the drive motor 21 completes two rotations. Therefore, every second first detection signal is the first detection signal transmitted when the rotational positions of the drive motor 21 and the hob H correspond to their respective zero positions. The drive control section 33 recognizes such a first detection signal and stops the drive motor 21 so that the rotational positions of the drive motor 21 and the hob H correspond to their respective zero positions. Further, since the speed ratio of the rotational speed of the drive motor 27 to the rotational speed of the workpiece W is 1 to 1, the rotational position of the workpiece W always corresponds to its zero position when the drive motor 27 is stopped so that its rotational position corresponds to its zero position.

According to the machine tool 1 of the first embodiment thus configured, the workpiece W is machined by, under the control by the drive control section 33, causing the drive motors 21, 27 to rotate the hob H and the workpiece W about their respective axes and causing the feed mechanism (not shown) to relatively move the hob H and the workpiece W in a state where they are in contact with each other. At this time, the hob H and the workpiece W are rotated using their respective zero positions as reference.

When stopping the drive motors 21, 27 being rotating, a first detection signal transmitted when the rotational positions of the drive motor 21 and the hob H correspond to their respective zero positions and a second detection signal transmitted when the rotational positions of the drive motor 27 and the workpiece W correspond to their respective zero positions are recognized on the basis of the speed ratios stored in the speed-ratio storage section 32 and the detection signals transmitted from the zero-position detecting section 31, and the drive motors 21, 27 are stopped so that the rotational positions of the drive motors 21, 27, the hob H and the workpiece W correspond to their respective zero positions.

Therefore, according to the machine tool 1 of the first embodiment, even when the rotational speed of the drive motor 21 and the rotational speed of the hob H are different from each other, the drive motor 21 can be stopped with the rotational positions of the drive motor 21 and the hob H corresponding to their respective zero positions. It is noted that, since the rotational speed of the drive motor 27 and the rotational speed of the workpiece W are equal to each other, the drive motor 27 can naturally be stopped with the rotational positions of the drive motor 27 and the workpiece W corresponding to their respective zero positions.

Consequently, when the workpiece W is thereafter further machined, such as when finishing is performed on the workpiece W, the subsequent machining can be performed without any additional operation, such as repositioning the rotational positions of the drive motors 21, 27, the hob H and the workpiece W at their respective zero positions, being required. Further, it is possible to surely prevent phase shift between the hob H and the workpiece W, and therefore it is possible to prevent the occurrence of a problem that gear teeth which were machined and formed in the preceding process are damaged by the machining of the subsequent process and a problem that a large load is applied to the hob H and thereby the hob H is broken. Furthermore, the occurrence of these problems can be prevented without particularly providing any new component.

It is noted that, although the above-exemplified configuration is configured in such a manner that, when stopping the drive motors 21, 27, the drive motors 21, 27 are stopped with the rotational positions of the drive motors 21, 27, the hob H and the workpiece W corresponding to their respective zero positions, a configuration is possible in which, when restarting gear cutting after stopping the drive motors, 21, 27 with each of the rotational positions of the drive motors 21, 27, the hob H and the workpiece W at an optional rotational position, the machining is restarted after a positioning operation for bringing the rotational positions of the drive motors 21, 27, the hob H and the workpiece W into correspondence with their respective zero positions is performed.

That is, before restarting gear cutting, the drive control section 33 rotates the drive motors 21, 27, and, for the drive motor 21 and the hob H, recognizes, on the basis of the speed ratio of the rotational speed of the drive motor 21 to the rotational speed of the hob H stored in the speed-ratio storage section 32 and the first detection signals transmitted from the zero-position detecting section 31, a first detection signal transmitted when the rotational positions of the drive motor 21 and the hob H correspond to their respective zero positions, and stops the drive motor 21 with the rotational positions of the drive motor 21 and the hob H corresponding to their respective zero positions, and, for the drive motor 27 and the workpiece W, similarly, recognizes, on the basis of the speed ratio of the rotational speed of the drive motor 27 to the rotational speed of the workpiece W stored in the speed-ratio storage section 32 and the second detection signals transmitted from the zero-position detecting section 31, a second detection signal transmitted when the rotational positions of the drive motor 27 and the workpiece W correspond to their respective zero positions, and stops the drive motor 27 with the rotational positions of the drive motor 27 and the workpiece W corresponding to their respective zero positions. Thereafter, the drive control section 33 rotates the drive motors 21, 27 again and thereby rotates the hob H and the workpiece W at their respective predetermined rotational speeds, and causes the feed mechanism (not shown) to relatively move the hob H and the workpiece W appropriately, thereby machining the workpiece W.

In this way, it is possible to restart machining the workpiece W with the phase of the hob H and the phase of the workpiece W corresponding to each other even if the drive motors 21, 27 were stopped with the rotational positions of the drive motors 21, 27, the hob H and the workpiece W at optional rotational positions which do not correspond to their zero positions.

Therefore, similarly to the above, it is possible to prevent the occurrence of the problem that gear teeth which were machined and formed in the preceding process are damaged by the machining of the subsequent process and the problem that a large load is applied to the hob H and thereby the hob H is broken.

Figure 2:
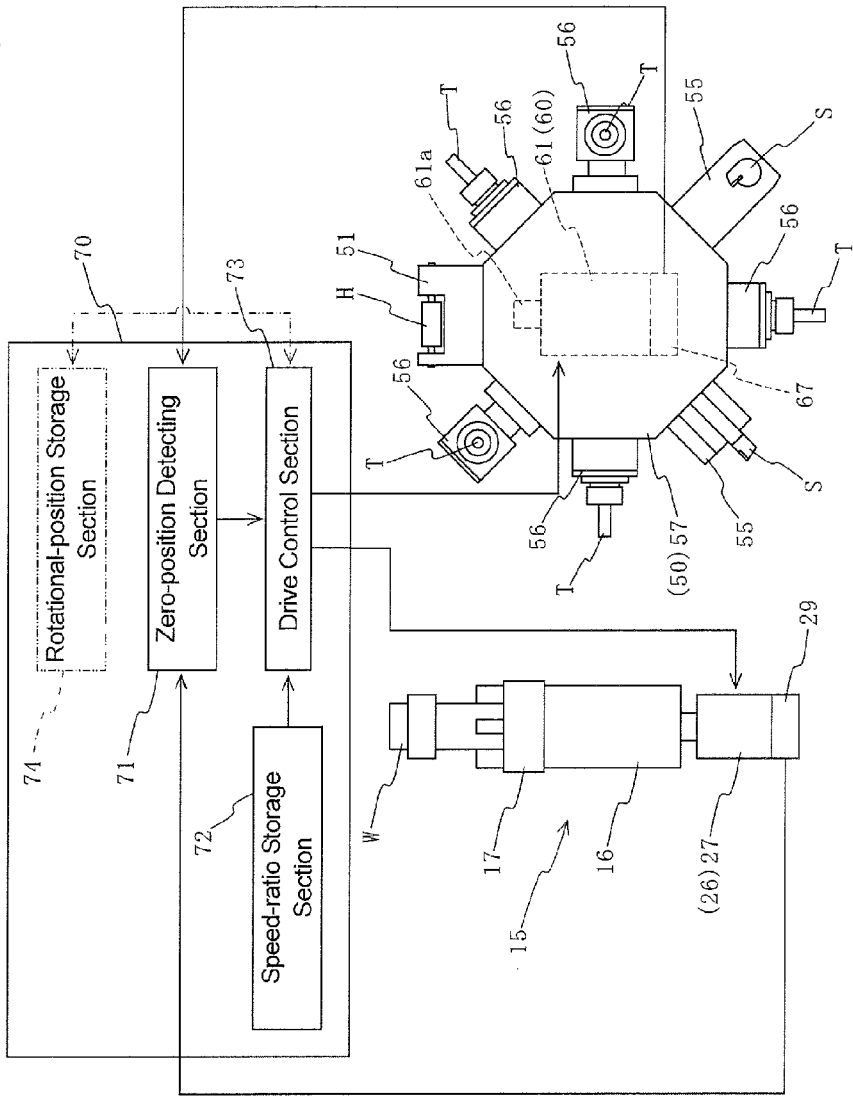
FIG. 2 is a schematic diagram showing a schematic configuration of a machine tool according to a second embodiment of the present disclosure, wherein the configuration is partially shown by a block diagram.
Figure 3:
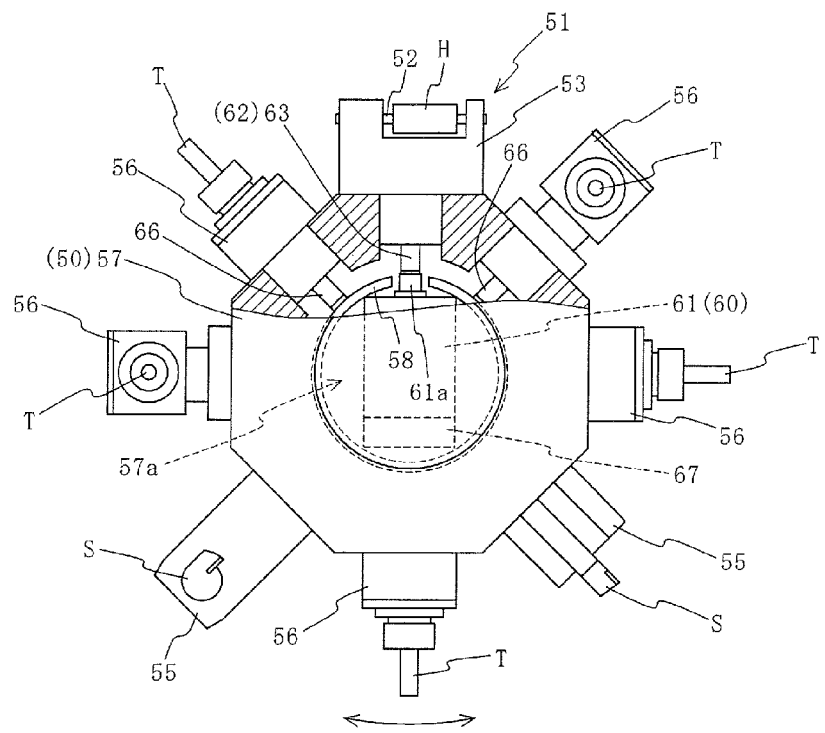
FIG. 3 is a front view showing a schematic configuration of a turret according to the second embodiment.
Figure 4:
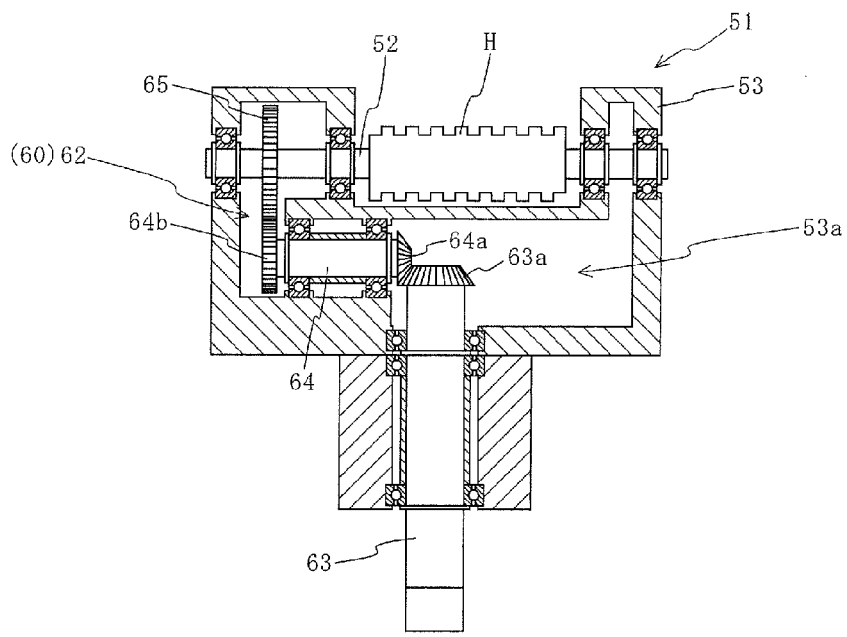
FIG. 4 is a sectional view showing a schematic configuration of a hob holder according to the second embodiment.

As shown in FIGS. 2 to 4, a machine tool 2 according to a second embodiment of the present disclosure has a tool rest 50 having a hob holder 51 holding a cylindrical hob H in such a manner that it is rotatable about its axis, turning tool holders 55 holding turning tools S, rotary tool holders 56 holding rotary tools T in such a manner that they are rotatable about their respective axes and a rotation drive mechanism 60 for rotating the hob H held by the hob holder 51 and the rotary tools T held by the rotary tool holders 56 about their respective axes, the workpiece holding body 15, the workpiece driving mechanism 26, the feed mechanism (not shown) for feeding the hob H, the tuning tools S and the rotary tools T and the workpiece W, and a controller 70 for controlling the operations of the rotation drive mechanism 60, the workpiece driving mechanism 26 and the feed mechanism (not shown). It is noted that in the second embodiment, the same reference numerals are assigned to the same components as those of the machine tool 1 of the above first embodiment and detailed explanation thereof is omitted.

The tool rest 50 has, in addition to the hob holder 51, the turning-tool holders 55, the rotary-tool holders 56 and the rotation drive mechanism 60, a turret 57 which is formed in a polygonal-prism shape and on the outer peripheral surface of which the plurality of holders 51, 55, 56 are attachably/detachably attached, a tool rest body (not shown) supporting the turret 57 in such a manner that it is rotatable about its axis in the direction indicated by the arrow, and an indexing mechanism (not shown) for indexing a predetermined holder 51, 55 or 56 (the hob H or a tool S or T) at a machining position by rotating the turret 57 about its axis.

The hob holder 51 comprises a hob shaft 52 fitted in the central hole of the hob H with its both ends protruding therefrom, and a holding member 53 holding the ends of the hob shaft 52 in such a manner that the hob shaft 52 is rotatable about its axis, and the hob holder 51 holds the hob H with the axes of the hob H and the workpiece W orthogonal to each other.

The rotation drive mechanism 60 comprises a drive motor 61 supported by the tool rest body within an inner space 57a of the turret 57, a transmission mechanism 62 provided in the hob holder 51 for transmitting the rotational force of the drive motor 61 to the hob shaft 52, and transmission shafts 66 provided in the rotary tool holders 56 for transmitting the rotational force of the drive motor 61 to the rotary tools T. The rotation drive mechanism 60 engages an output shaft 61a of the drive motor 61 with the transmission mechanism 62 of the hob holder 51 when the hob holder 51 is indexed at the machining position and with the transmitting shaft 66 of the indexed rotary-tool holder 56 when one of the rotary tool holders 56 is indexed at the machining position, to transmit the rotational force of the drive motor 61 thereto.

The transmission mechanism 62 comprises first and second rotary shafts 63 and 64 supported within an inner space 53a of the holding member 53 in such manner that they are rotatable about their respective axes, and a gear 65 provided on one end of the hob shaft 52. The first rotary shaft 63 is engaged with the output shaft 61a of the drive motor 61 at one end thereof and has a gear 63a provided on the other end thereof. The second rotary shaft 64 has a gear 64a meshing with the gear 63a on one end thereof and a gear 64b meshing with the gear 65 on the other end thereof. The rotational force of the drive motor 61 is transmitted to the hob shaft 52 via the first rotary shaft 63, the gears 63a, 64a, the second rotary shaft 64, and the gears 64b, 65, and thereby the hob H is rotated together with the hob shaft 52.

Further, the gears 63a, 64a, 64b, 65 are configured in such a manner that the speed ratio of the rotational speed of the gear 63a on the driving side to the rotational speed of the gear 65 on the driven side is not 1 to 1, and therefore the hob H is rotated at a rotational speed different from the rotational speed of the drive motor 61.

The drive motor 61 has a rotary encoder 67 attached thereto for detecting the rotational position of the drive motor 61. Further, for each of the hob holder 51 and the rotary-tool holders 56, when it is indexed at a position other than the machining position by the indexing mechanism (not shown), the connection between the drive motor 61 and the first rotary shaft 63 (hob H) or the connection between the drive motor 61 and the transmission shaft 66 (rotary tool T) is released. At this time, the first rotary shaft 63 or the transmission shaft 66 is engaged with a rotation regulating member 58 at one end thereof and thereby its rotation is regulated.

The controller 70 has a zero-position detecting section 71 for detecting that the rotational position of the drive motor 61 is at its zero position and that the rotational position of the drive motor 27 is at its zero position, a speed-ratio storage section 72 in which the speed ratio of the rotational speed of the drive motor 61 to the rotational speed of the hob H and the speed ratio of the rotational speed of the drive motor 27 to the rotational speed of the workpiece W (1 to 1) are stored, and a drive control section 73 for controlling the drive motors 61, 27, the feed mechanism (not shown) and the indexing mechanism (not shown). It is noted that the zero-position detecting section 71 and the rotary encoders 67, 29 correspond to the aforementioned first and second detecting means.

When the rotational position of the drive motor 61 is brought into correspondence with its zero position, the zero-position detecting section 71 detects the correspondence on the basis of the rotational position of the drive motor 61 detected by the rotary encoder 67 and transmits a first detection signal. It is noted that a second detection signal is transmitted similarly to the above-described first embodiment. Further, the zero positions of the drive motors 61, 27, the hob H and the workpiece W are each optionally set, and the zero positions of the drive motor 61 and the hob H are positioned at the same rotational angular position and the zero positions of the drive motor 27 and the workpiece W are similarly positioned at the same rotational angular position.

The drive control section 73, similarly to the above-described first embodiment, causes the drive motor 61 to rotate the hob shaft 52 and the hob H and causes the drive motor 27 to rotate the spindle 16, the chuck 17 and the workpiece W, and causes the feed mechanism (not shown) to relatively move the hob H and the workpiece W, thereby performing gear cutting on the workpiece W.

Further, after indexing the hob H at the machining position and machining the workpiece W with the hob H, when the drive control section 73 accepts a tool change command or a turret rotation command and indexes a tool S or T other than the hob H at the machining position to perform the subsequent machining, the drive control section 73 controls the drive motors 61, 27 and the indexing mechanism (not shown) in the following manner.

That is, for the drive motor 61, the drive control section 73 recognizes, on the basis of the speed ratio of the rotational speed of the drive motor 61 to the rotational speed of the hob H stored in the speed-ratio storage section 72 and the first detection signals transmitted from the zero-position detecting section 71, a first detection signal transmitted when the rotational positions of the drive motor 61 and the hob H correspond to their respective zero positions, and stops the drive motor 61 so that the rotational positions of the drive motor 61 and the hob H correspond to their respective zero positions. On the other hand, for the drive motor 27, the drive control section 73 recognizes, on the basis of the speed ratio of the rotational speed of the drive motor 27 to the rotational speed of the workpiece W stored in the speed-ratio storage section 72 and the second detection signals transmitted from the zero-position detecting section 71, a second detection signal transmitted when the rotational positions of the drive motor 27 and the workpiece W correspond to their respective zero positions, and stops the drive motor 27 so that the rotational positions of the drive motor 27 and the workpiece W correspond to their respective zero positions. Thereafter, the drive control section 73 causes the indexing mechanism (not shown) to rotate the turret 57 to index a tool S or T other than the hob H at the machining position, and releases the engagement (connection) between the first rotary shaft 63 and the output shaft 61a of the drive motor 61.

In a case where the speed ratio of the rotational speed of the drive motor 61 to the rotational speed of the hob H is, for example, 3 to 1, the hob H completes only ⅓ rotation when the drive motor 61 completes one rotation and the hob H completes one rotation when the drive motor 61 completes three rotations. Therefore, every third first detection signal is the first detection signal transmitted when the rotational positions of the drive motor 61 and the hob H correspond to their respective zero positions. The drive control section 73 recognizes such a first detection signal and stops the drive motor 61 so that the rotational positions of the drive motor 61 and the hob H correspond to their respective zero positions, and then rotates the turret 57.

According to the machine tool 2 of the second embodiment thus configured, under the control by the drive control section 73, the hob H and the workpiece W are rotated using their respective zero positions as reference in a state where the hob H is indexed at the machining position, and the workpiece W is machined in this state.

When finishing machining the workpiece W with the hob H and stopping the drive motors 61, 27 being rotating to machine the workpiece W with a tool S or T other than the hob H, a first detection signal transmitted when the rotational positions of the drive motor 61 and the hob H correspond to their respective zero positions and a second detection signal transmitted when the rotational positions of the drive motor 27 and the workpiece W correspond to their respective zero positions are recognized on the basis of the speed ratios stored in the speed-ratio storage section 72 and the first and second detection signals transmitted from the zero-position detecting section 71, and the drive motors 61, 27 are stopped so that the rotational positions the drive motors 61, 27, the hob H and the workpiece W correspond to their respective zero positions. Thereafter, by the indexing mechanism (not shown), the turret 57 is rotated and the connection between the hob H and the drive motor 61 is released.

Thus, according to the machine tool 2 of the second embodiment, similar effects to those of the machine tool 1 of the above-described first embodiment can be achieved, and in addition thereto, the following effect can be achieved. That is, since the drive motor 61 and the hob H are stopped with the rotational positions of the drive motor 61 and the hob H corresponding to their respective zero positions and the connection between the drive motor 61 and the hob H is released in this state, when reconnecting the drive motor 61 and the hob H to each other, as long as, because the rotation of the hob H is regulated by the rotation regulating member 58, the rotational position of the drive motor 61 has not been changed, the subsequent machining can be performed immediately after connecting the drive motor 61 and the hob H to each other without any additional operation, such as repositioning the rotational positions of the drive motors 61, 27, the hob H and the workpiece W at their respective zero positions, being required.

It is advantageous that, when stopping the drive motor 61 after machining the workpiece W with a tool S or T other than the hob H, similarly to the above, the drive motor 61 is stopped so that its rotational position corresponds to its zero position. Alternatively, a configuration is possible in which the drive motor 61 is stopped with its rotational position at an optional rotational position when stopping the drive motor 61 after machining the workpiece W with a tool S or T other than the hob H and the rotational position of the drive motor 61 is brought into correspondence with its zero position in advance before reconnecting the drive motor 61 and the hob H to each other.

Further, although in the above exemplified embodiment, the rotational positions of the drive motors 61, 27, the hob H and the workpiece W are brought into correspondence with their respective zero positions before rotating the turret 57 to index a tool S or T other than the hob H at the machining position, the rotational positions of the drive motors 61, 27, the hob H and the workpiece W may be brought into correspondence with their respective zero positions after rotating the turret 57 and thereby indexing the hob H at the machining position and reconnecting the drive motor 61 and the hob H to each other.

In this case, the controller 70 further has a rotational-position storage section 74 in which the rotational position of the drive motor 61 and the rotational position of the hob H when the connection therebetween is released, and the drive control section 73 stores the rotational position of the drive motor 61 and the rotational position of the hob H when the connection therebetween is released in the rotational-position storage section 74. It is noted that the rotational position of the drive motor 61 can be recognized on the basis of the detection value of the rotary encoder 67 and the rotational position of the hob H can be recognized on the basis of the detection value of the rotary encoder 67 and the speed ratio of the rotational speed of the drive motor 61 to the rotational speed of the hob H stored in the speed-ratio storage section 72.

For indexing the hob H at the machining position again and reconnecting the drive motor 61 and the hob H to each other in a state where a tool S or T other than the hob H is indexed at the machining position, the drive control section 73 controls the drive motors 61, 27 and the indexing mechanism (not shown) in the following manner.

That is, before indexing the hob H at the machining position, the rotational position of the drive motor 61 stored in the rotational-position storage section 74 is read out and the drive motor 61 is driven so that the rotational position of the drive motor 61 corresponds to the rotational position of the drive motor 61 read out (the rotational position of the drive motor 61 when the connection between the drive motor 61 and the hob H was released). Subsequently, the turret 57 is rotated by the indexing mechanism (not shown) and thereby the hob H is indexed at the machining position, and then the first rotary shaft 63 is connected to the output shaft 61a of the drive motor 61.

Thereafter, the drive motor 61 is rotated, and a first detection signal transmitted when the rotational positions of the drive motor 61 and the hob H correspond to their respective zero positions is recognized on the basis of the speed ratio of the rotational speed of the drive motor 61 to the rotational speed of the hob H stored in the speed-ratio storage section 72, the rotational positions of the drive motor 61 and the hob H when the connection therebetween was released, which are stored in the rotational-position storage section 74, and the first detection signals transmitted from the zero-position detecting section 71, and the drive motor 61 is stopped when the rotational positions of the drive motor 61 and the hob H are brought into correspondence with their respective zero positions.

On the other hand, similarly to the above, the drive motor 27 is also driven and thereby rotated, and a second detection signal transmitted when the rotational positions of the drive motor 27 and the workpiece W correspond to their respective zero positions is recognized on the basis of the speed ratio of the rotational speed of the drive motor 27 to the rotational speed of the workpiece W stored in the speed-ratio storage section 72 and the second detection signals transmitted from the zero-position detecting section 71, and the drive motor 27 is stopped when the rotational positions of the drive motor 27 and the workpiece W are brought into correspondence with their respective zero positions.

After, in this way, the rotational positions of the drive motor 61 and the hob H are brought into correspondence with their respective zero positions and the rotational positions of the drive motor 27 and the workpiece W are brought into correspondence with their respective zero positions, the drive motors 61, 27 are rotated at their respective predetermined rotational speeds and the hob H and the workpiece W are relatively moved by the feed mechanism (not shown), and thereby the workpiece W is machined.

According to this embodiment, similar effects to those of the machine tool 1 of the above-described first embodiment can be achieved, and in addition thereto, the following effect can be achieved. That is, since the rotational positions of the drive motors 61, 27, the hob H and the workpiece W are brought into correspondence with their respective zero positions before machining the workpiece W after connecting the drive motor 61 and the hob H to each other, even when the drive motor 61 was stopped with the rotational positions of the drive motor 61 and the hob H shifted from their respective zero positions and the connection therebetween was released, when restarting machining the workpiece W with the hob H, the machining can be restarted with the phase of the hob H and the phase of the workpiece W corresponding to each other.

Thus, specific embodiments of the present disclosure have been described. However, a specific embodiment in which the disclosure can be implemented is not limited thereto.

In the above embodiments, both of the speed ratio of the rotational speed of the drive motor 21 to the rotational speed of the hob H and the speed ratio of the rotational speed of the drive motor 27 to the rotational speed of the workpiece W are stored in the speed-ratio storage section 32, and both of the speed ratio of the rotational speed of the drive motor 61 to the rotational speed of the hob H and the speed ratio of the rotational speed of the drive motor 27 to the rotational speed of the workpiece W are stored in the speed-ratio storage section 72. However, since the speed ratio of the rotational speed of the drive motor 27 to the rotational speed of the workpiece W is 1 to 1, only the speed ratio of the rotational speed of the drive motor 21 to the rotational speed of the hob H may be stored in the speed-ratio storage section 32, and only the speed ratio of the rotational speed of the drive motor 61 to the rotational speed of the hob H may be stored in the speed-ratio storage section 72.

In this case, when stopping the hob H and the workpiece W, the drive control section 33, 37 recognizes a first detection signal transmitted when the rotational positions of the drive motor 21, 61 and the hob H correspond to their respective zero positions on the basis of the speed ratio stored in the speed-ratio storage section 32, 72 and the first detection signals transmitted from the zero-position detecting section 31, 71, and stops the drive motor 21, 61 so that the rotational positions of the drive motor 21, 61 and the hob H correspond to their respective zero positions, and stops the drive motor 27 so that the rotational positions of the drive motor 27 and the workpiece W correspond to their respective zero positions on the basis of the second detection signals transmitted from the zero-position detecting section 31, 71.

Furthermore, in the above embodiments, the rotational speed of the workpiece W may be different from the rotational speed of the drive motor 27. In this case, the rotational position of the drive motor 27 and the rotational position of the workpiece W can be brought into correspondence with their respective zero positions in a similar method to that used for the drive motor 21 and the hob H.

What is claimed is:

1. A machine tool for performing gear cutting on a workpiece with a hob, comprising:
   a first holding member for holding the hob;
   a second holding member for holding the workpiece;
   first drive means having a first drive motor for rotating the hob held by the first holding member about its axis;
   second drive means having a second drive motor for rotating the workpiece held by the second holding member about its axis;
   first detecting means transmitting a first detection signal when detecting that a rotational position of the first drive motor is at its zero position;
   second detecting means transmitting a second detection signal when detecting that a rotational position of the second drive motor is at its zero position; and
   control means for controlling the operation of the first and second drive motors,
   either rotational speeds of the first drive motor and the hob or rotational speeds of the second drive motor and the workpiece being set at rotational speeds different from each other, wherein,
   the first drive means is configured to be able to be switched between a connected state where the first drive motor and the hob are connected to each other and a released state where the connection therebetween is released, and
   the control means is configured to, when stopping the drive motors and switching the first drive means into the released state, recognize, on the basis of a first speed ratio of the rotational speed of the first drive motor to the rotational speed of the hob and a second speed ratio of the rotational speed of the second drive motor to the rotational speed of the workpiece and on the basis of detection signals transmitted from the first and second detections means, detection signals transmitted when the rotational positions of the drive motors and the rotational positions of the hob and the workpiece correspond to their respective zero positions, and stop the drive motors so that the rotational positions of the drive motors, the hob and the workpiece correspond to their respective zero positions, and then switch the first drive means into the released state.

2. A machine tool for performing gear cutting on a workpiece with a hob, comprising:
   a first holding member for holding the hob;
   a second holding member for holding the workpiece;
   first drive means having a first drive motor for rotating the hob held by the first holding member about its axis;
   second drive means having a second drive motor for rotating the workpiece held by the second holding member about its axis;
   first detecting means transmitting a first detection signal when detecting that the rotational position of the first drive motor is at its zero position;
   second detecting means transmitting a second detection signal when detecting that the rotational position of the second drive motor is at its zero position; and
   control means for controlling the operation of the first and second drive motors,
   either rotational speeds of the first drive motor and the hob or rotational speeds of the second drive motor and the workpiece being set at rotational speeds different from each other, wherein,
   the machine tool further comprises rotational-position detecting means for detecting the rotational position of the first drive motor,
   the first drive means is configured to be able to be switched between a connected state where the first drive motor and the hob are connected to each other and a released state where the connection therebetween is released,
   the control means further has rotational-position storage means in which the rotational position of the first drive motor when stopped which is detected by the rotational-position detecting means and the rotational position of the hob when stopped which is calculated on the basis of the speed ratio of the rotational speed of the first drive motor to the rotational speed of the hob and the rotational position of the first drive motor when stopped are stored, and
   the control means is configured to, when switching the first drive means from the released state to the connected state and restarting machining the workpiece, position the rotational positions of the drive motors, the hob and the workpiece by driving the first drive motor and stopping the first drive motor so that the rotational position of the first drive motor corresponds to the rotational position thereof stored in the rotational-position storage means before connecting the first drive motor and the hob, and then switching the first drive means into the connected state and rotating the drive motors, recognizing, on the basis of a first speed ratio of the rotational speed of the first drive motor to the rotational speed of the hob and a second speed ratio of the rotational speed of the second drive motor to the rotational speed of the workpiece and on the basis of the first and second detection signals transmitted from the first and second detecting means and the rotational position of the hob when the first drive means was switched into the released state and the rotational position of the first drive motor when its rotation was stopped, first and second detection signals transmitted when the rotational positions of the drive motors and the rotational positions of the hob and the workpiece correspond to their respective zero positions and stopping the drive motors so that the rotational positions of the drive motors, the hob and the workpiece correspond to their respective zero positions, and then rotate the drive motors to restart machining the workpiece.

* * * * *